(12) United States Patent
Niebling et al.

(10) Patent No.: US 9,377,055 B2
(45) Date of Patent: Jun. 28, 2016

(54) WHEEL BEARING ARRANGEMENT WITH ENCODER PROTECTION AND CENTERING DEVICE

(75) Inventors: Peter Niebling, Bad Kissingen (DE); Roland Langer, Schwanfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/368,440

(22) PCT Filed: Mar. 23, 2012

(86) PCT No.: PCT/EP2012/055171
§ 371 (c)(1),
(2), (4) Date: Jun. 24, 2014

(87) PCT Pub. No.: WO2013/120541
PCT Pub. Date: Aug. 22, 2013

(65) Prior Publication Data
US 2014/0321784 A1    Oct. 30, 2014

(30) Foreign Application Priority Data

Feb. 16, 2012    (DE) .......................... 10 2012 002 961

(51) Int. Cl.
*F16C 13/02*    (2006.01)
*F16C 33/76*    (2006.01)
*F16C 33/80*    (2006.01)
(Continued)

(52) U.S. Cl.
CPC .............. *F16C 33/805* (2013.01); *F16C 33/768* (2013.01); *F16C 41/007* (2013.01); *B60B 27/0036* (2013.01); *F16C 19/186* (2013.01); *F16C 33/7883* (2013.01); *F16C 35/063* (2013.01); *F16C 2326/02* (2013.01)

(58) Field of Classification Search
CPC . F16C 33/805; F16C 41/007; B60B 27/0005; B60B 27/001
USPC .......................... 384/448, 489, 544, 589, 480
See application file for complete search history.

(56) References Cited

U.S. PATENT DOCUMENTS 5,470,157 A * 11/1995 Dougherty .......... F16C 33/7886
324/207.25
6,267,509 B1    7/2001 Morimura
(Continued)

FOREIGN PATENT DOCUMENTS

DE    102007050256    4/2009
DE    102008038682    2/2010
(Continued)

*Primary Examiner* — Phillip A Johnson
(74) *Attorney, Agent, or Firm* — Davidson, Davidson & Kappel, LLC

(57) ABSTRACT

A wheel bearing arrangement having an outer ring (12), an inner ring (13), and a seal arranged between the outer ring (12) and the inner ring (13) for the purpose of sealing off a rolling chamber, wherein, in the rolling chamber, rolling bodies (10) roll in a load-bearing manner on raceways of the outer ring (12) and of the inner ring (13), wherein the cover element (32) has a fastening region (28) for the fastening of the cover element (32) radially at the outside to the outer ring (12). It is sought to further improve the encoder protection in a wheel bearing arrangement of said type by virtue of the cover element (32) having a collecting channel (27) which surrounds a joint bell housing (19) and thereby protecting the encoder (14) of the wheel bearing arrangement against fouling.

12 Claims, 2 Drawing Sheets

(51) Int. Cl.
*F16C 41/00* (2006.01)
*B60B 27/00* (2006.01)
*F16C 35/063* (2006.01)
*F16C 19/18* (2006.01)
*F16C 33/78* (2006.01)

(56) References Cited

U.S. PATENT DOCUMENTS

| | | | |
|---|---|---|---|
| 8,500,338 | B2 | 8/2013 | Walter et al. |
| 2004/0250619 | A1 | 12/2004 | Sakamoto |
| 2007/0172163 | A1 | 7/2007 | Yamamoto |
| 2007/0172164 | A1 | 7/2007 | Takada |
| 2009/0123101 | A1* | 5/2009 | Masuda ............ B60B 27/0005 384/477 |
| 2010/0209031 | A1 | 8/2010 | Kaneko et al. |
| 2010/0296759 | A1 | 11/2010 | Dlugai et al. |
| 2011/0164345 | A1* | 7/2011 | Chu .................... C23C 14/185 361/305 |
| 2011/0170817 | A1 | 7/2011 | Niebling et al. |
| 2011/0221142 | A1 | 9/2011 | Wang et al. |
| 2011/0298272 | A1 | 12/2011 | Cermak |
| 2012/0281939 | A1 | 11/2012 | Nakamura et al. |

FOREIGN PATENT DOCUMENTS

| | | |
|---|---|---|
| DE | 102008050127 | 4/2010 |
| EP | 0286151 | 10/1988 |
| EP | 0968851 | 1/2000 |
| EP | 2048387 | 4/2009 |
| EP | 2103451 | 9/2009 |
| EP | 2159578 | 3/2010 |
| JP | 2005265826 | 9/2005 |
| JP | 2007127143 | 5/2007 |
| WO | WO 2011/043266 | 4/2011 |

* cited by examiner

WHEEL BEARING ARRANGEMENT WITH ENCODER PROTECTION AND CENTERING DEVICE

The present invention relates to a wheel bearing arrangement, including an outer ring, an inner ring and a sealing arrangement situated between the outer ring and the inner ring for sealing a rolling chamber, rolling bodies in the rolling chamber rolling in a load-bearing manner on tracks of the outer ring and the inner ring, the cover element having a fastening area for radially fastening the cover element to the outer ring or to a wheel support on the outside or inside.

BACKGROUND

Wheel bearings having rotational speed sensors are used extensively in automotive engineering, in particular in connection with anti-lock braking systems (ABS). For this purpose, signal transmitters in the form of encoders, in particular multipole encoders, are mounted on the wheel hub or an inner ring of the wheel hub for the purpose of executing the rotary rotation and being sensed by a detector.

Unfortunately, particles accumulate on the encoder, which are magnetizable thereby because they are attracted by its alternating magnetic north and south poles (ferromagnetic dirt particles). This results in a magnetic short-circuit at the poles or even damage, which threatens the functionality of the ABS system or even causes it to fail. In the past, encoders were protected with sheet metal rings or sheet metal caps to prevent this from happening.

A wheel bearing having a cover sheet is known from EP 0 968 851 B1, which is fastened to the outer ring of the wheel bearing and bridges the contact area to the joint bell housing, a static sealing lip being fastened axially on the end of the cover sheet and resting against the joint bell housing to form a seal.

SUMMARY OF THE INVENTION

It is an object of the present invention to provide a wheel bearing arrangement including a cover element, in which the protection is further improved, while the manufacturing complexity is preferably minimized.

The present invention provides a wheel bearing unit in such a way that the cover element has a collecting channel surrounding the joint bell housing and protects an encoder of the wheel bearing arrangement against contamination.

The wheel bearing arrangement has an outer ring, an inner ring and a sealing arrangement situated between the outer ring and the inner ring for sealing a rolling chamber. A rolling chamber is understood to be the chamber in which the rolling bodies are situated. This rolling chamber is delimited by the tracks, the inner ring, the wheel hub and the sealing arrangements of the wheel bearing. In the rolling chamber, the rolling bodies roll on tracks of the outer ring and the inner ring in a load-bearing manner. The cover element has a fastening area for radially fastening the cover element to the outer ring on the outside or inside. The cover element is held on the outer ring or wheel support, for example using a force fit, and has a collecting channel surrounding the joint bell housing. The area between the joint bell housing and the wheel bearing is thus protected by the cover element, whereby, in particular, no magnetic or magnetizable particles may reach the encoder, which is fastened on the wheel hub or on the inner ring. Another advantage of the arrangement of the sealing element is the simplified installation of the wheel bearing or the wheel bearing unit on the joint bell housing. The cover element functions as a radial positioning aid (precentering), which makes it easier to guide the joint bell housing to the wheel bearing. In particular, this becomes positively apparent in spur gear teeth, because the spur gear teeth must be guided thereto for engagement with the counter gear teeth.

In one advantageous specific embodiment, the inner ring is indirectly or directly drivable via spur gear teeth, and the spur gear teeth engage with counter gear teeth of the joint bell housing, both gear tooth systems being partially or entirely radially surrounded by a cover element. The inner ring may be driven directly via spur gear teeth molded thereon, or it may be indirectly driven via a spur-geared rolling rivet unit of the wheel hub, on which the inner ring is mounted. Spur gear teeth in the area between the wheel bearing and the joint bell housing are thus also protected against dirt and water.

The cover element may advantageously be provided for precentering during mounting of the propshaft for the purpose of protecting a sealing lip. This sealing lip may be molded on a sealing element or another element of the wheel bearing, including the cover element itself.

The cover element advantageously has an opening for radially or axially inserting a sensor. The sensor may thus enter the reading area axially or radially next to the encoder. The sensor may ideally seal the opening with the aid of a static seal for the purpose of further increasing the protection of the encoder. The opening between the sensor and sealing element is ideally sealed with the aid of a grommet or a sealing ring.

The collecting channel may form part of a labyrinth seal, the function thereof not being limited only to the collection and discharge of the dirty water but also shielding the read area of the sensor, including the encoder, by correspondingly forming a gap. The joint bell housing, together with the collecting channel, may form the labyrinth seal. Either the collecting channel may have a preferably short radial distance to a cylindrical surface and forms a labyrinth in this way, or the joint bell housing has moldings which, together with the collecting channel, form a labyrinth. For example, the collecting channel is at least partially situated in a groove running in the circumferential direction in the joint bell housing. The groove is ideally open axially in the direction of the wheel bearing.

In a spur-geared wheel bearing arrangement, a sealing element for sealing or protecting the gear tooth systems may form the labyrinth seal together with the collecting channel. The sealing element may have an essentially cylindrical design and rest on both the joint bell housing and on the wheel hub. To bridge a radial difference in radii, the sealing element may be offset at one or multiple points.

In one advantageous specific embodiment, the sealing element radially surrounds the collecting channel axially on the end. Water is thus able to flow continuously downward from the labyrinth seal, even though the sealing element prevents the water from entering the gap between the collecting channel and the sealing element from above. In this way, a labyrinth seal may be provided, which is executable on the basis of metal sheets, since the joint bell housing does not have to be involved.

The sealing element for protecting the spur gear teeth is preferably fastened to the inner ring or the wheel hub, making it easy to be installed, together with the wheel bearing, on the joint bell housing.

The sealing element may have an elastic part and a supporting part. In this way, a certain stiffness may be achieved with the aid of the supporting part, and sealing lips for static seals may be provided with the aid of the elastic part, or even elements for forming the labyrinth seal.

Additional advantageous embodiments and preferred refinements of the present invention are provided in the description of the figures and/or the subclaims.

BRIEF DESCRIPTION OF THE DRAWINGS

The present invention is described and explained in greater detail below on the basis of exemplary embodiments illustrated in the figures.

DETAILED DESCRIPTION

Figure 1:
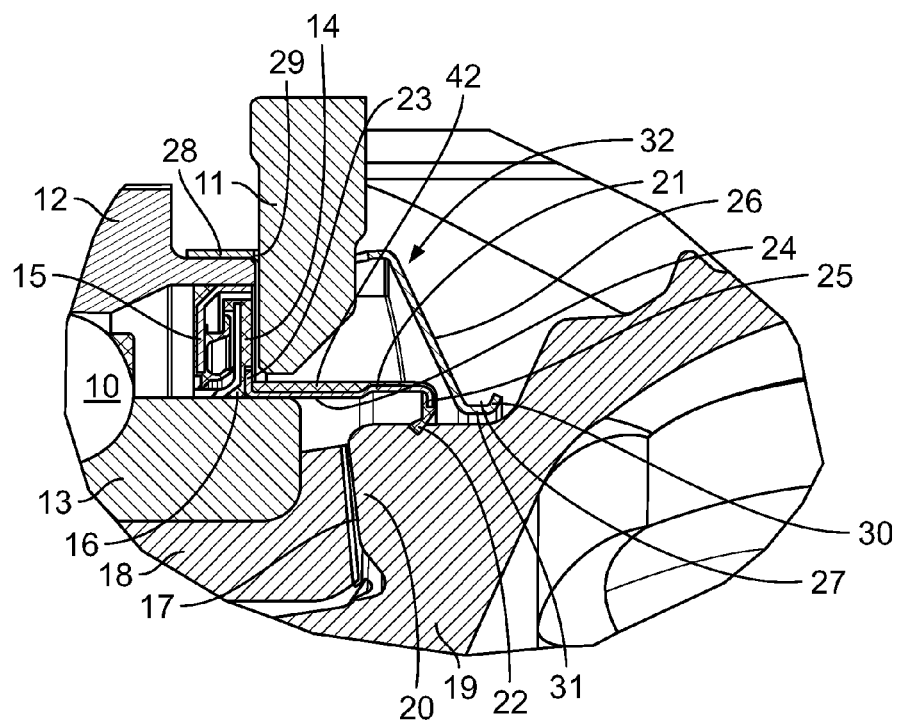
FIG. 1 shows a wheel bearing arrangement including a first cover element.

FIG. 1 shows a wheel bearing arrangement, including a first cover element 32. Cover element 32 protects encoder 14, which acts as a signal transmitter with respect to sensor 11, because it is mounted on a rotatable inner ring 13 and is detected by sensor 11 in the axial direction. An air gap is located between sensor 11 and encoder 14, for which reason opening 29 in cover element 32 is selected to be as small as possible or is ideally sealed toward sensor 11.

In the present exemplary embodiment, the sensor arrangement is used for rotational speed measurement, as used in ABS systems. Sensor 11 may advantageously be readily removed or replaced.

The spur gear teeth are already protected by sealing element 24, so that no water is able to penetrate therein. For this purpose, essentially cylindrical sealing element 24 rests on inner ring 13, surrounds the spur gear teeth radially and provides a static seal against joint bell housing 19 with the aid of a sealing lip 22. Supporting part 21 acts as a static seal on the radial inside of sealing element 24 on inner ring 13.

Radial segment 23 of sealing element 24 is situated in recess 16 of encoder 14. Together with the cartridge seal, which is formed by sealing ring 15 and encoder 14, it forms a labyrinth seal which counteracts the penetration of the static seal of sealing element 24. In particular, the axial outer surfaces of encoder 14 and radial segment 23 are located on the same radial plane, which is defined by the rotation axis of the wheel bearing arrangement as the normal to the plane. The access to the static seal thus empties axially into the sensor chamber and forces penetrated water on the aforementioned plane to flow radially to the inside or, in a spinning action, radially to the outside without reaching the static seal.

Cover element 32 has a cylindrical fastening area 28, which is mounted on the outer surface of outer ring 12. Opening 29 is situated in this area, an edge of opening 29 being flush with the front side of outer ring 12 to be able to guide sensor 11 as closely as possible to the front side and to preferably minimize the air gap between sensor 11 and encoder 14 for better signal strength.

Cover element 32 transitions from fastening area 28 to a conical connecting piece 26 for the purpose of extending the cover to the vicinity of joint bell housing 19. On the end, connecting piece 26 axially transitions to a collecting channel 27, which is formed by a base 31, a curved end piece 30 and, in part, by conical connecting piece 26. Collecting channel 27 conveys spray water in the circumferential direction, so that it may drip downward by the force of gravity.

At the same time, the cylindrical (channel) base 31 of the collecting channel forms a sealing gap with joint bell housing 19 to prevent water from entering the sensor chamber. The sensor chamber is delimited by cover element 32, outer ring 12, the cartridge seal, sealing element 24 and the joint bell housing, a part of sensor 11 being situated in this sensor chamber.

In the exemplary embodiment in FIG. 1, encoder 14 is designed as a signal transmitter ring, which has the function of a spinning ring with respect to penetrated water. This does not absolutely have to be the case. Alternatively, the encoder may also be integrated into sealing element 24, in which case the detection direction would be radial instead of axial. In the present case, encoder 14 has a supporting ring made of cold-worked sheet metal, including an elastomer fastened thereto, which contains magnetizable particles which have alternating magnetization, so that they alternately form magnetic north and south poles.

Figure 2:
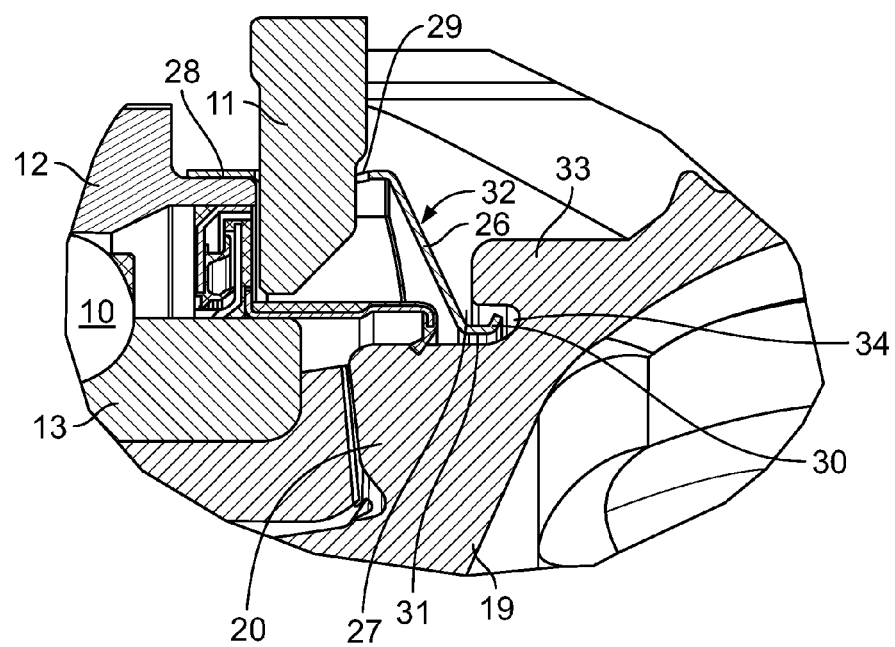
FIG. 2 shows a wheel bearing arrangement including the first cover element and a joint bell housing for forming a labyrinth seal.

FIG. 2 shows a wheel bearing arrangement including first cover element 32 and joint bell housing 19 for forming a labyrinth seal. Axially projecting shoulder 33 has an annular design and, together with the surrounding parts of joint bell housing 19, forms an annular groove 34, which partially radially surrounds collecting channel 27. An effective labyrinth seal is achieved thereby, which forces all penetrated water into collecting channel 27 and discharges it through this channel.

Figure 3:
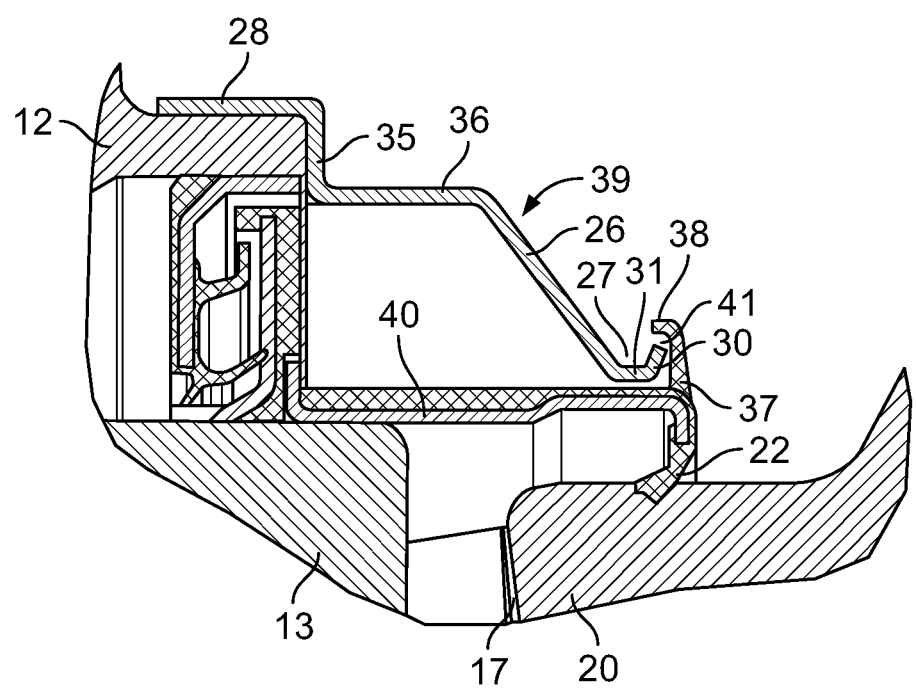
FIG. 3 shows a wheel bearing arrangement including a second cover element and a labyrinth seal based on cold-worked metal sheets.

FIG. 3 shows a third wheel bearing arrangement, including a second cover element 39 and a labyrinth seal based on cold-worked metal sheets. It is advantageous that the manufacturing costs may be kept low because a conventional joint bell housing may be used. The labyrinth seal is formed by a radial projection 37 of sealing element 40, curved end piece 30 being partially or entirely radially surrounded by a covering end piece 38 of radial projection 37. An axial outlet of the sealing gap into collecting channel 27 is thus created. Water is thus prevented from penetrating sealing gap 41 but is able to readily exit therefrom.

Cover element 39 in the exemplary embodiment in FIG. 3 has a disk-shaped section 35 and a cylindrical section 36 between conical connecting piece 26 and fastening area 28. This facilitates the handling and positioning of cover element 39, since disc-shaped section 35 is used as a stop on the front side of outer ring 12.

A sensor is not shown in FIG. 3, although there is nothing to prevent an opening from being provided therefor in (cylindrical) section 36.

In the exemplary embodiment in FIG. 3, sealing element 40 acts as a positioning aid for connecting gear tooth systems 17, 20, namely when radial sealing lip 22 is mounted on the joint bell housing.

In summary, the present invention relates to a wheel bearing arrangement, including an outer ring 12, an inner ring 13 and a sealing arrangement situated between outer ring 12 and inner ring 13 for sealing a rolling chamber, rolling bodies 10 in the rolling chamber rolling in a load-bearing manner on tracks of outer ring 12 and inner ring 13, cover element 32 having a fastening area 28 for radially fastening cover element 32 to outer ring 12 on the outside. The encoder protection of a wheel bearing arrangement of this type is to be further improved in that cover element 32 has a collecting channel 27 surrounding a joint bell housing 19 and thereby protects encoder 14 of the wheel bearing arrangement against contamination.

LIST OF REFERENCE NUMERALS

10 Rolling bodies
11 Sensor

12 Outer ring
13 Inner ring
14 Encoder
15 Sealing ring
16 Recess
17 Spur gear teeth
18 Wheel hub
19 Joint bell housing
20 Counter gear teeth
21 Supporting part
22 Sealing lip
23 Radial section
24 Sealing element
25 Radial section
26 Conical connecting piece
27 Collecting channel
28 Fastening area
29 Opening
30 Curved end piece
31 (Channel) base
32 Cover element
33 Axially projecting shoulder
34 Groove
35 Disk-shaped section
36 Cylindrical section
37 Radial projection
38 Covering end piece
39 Cover element
40 Sealing element
41 Sealing gap
42 Elastic part

The invention claimed is:

1. A wheel bearing arrangement comprising:
an outer ring;
an inner ring; and
a sealing arrangement situated between the outer ring and the inner ring for sealing a rolling chamber, rolling bodies in the rolling chamber rolling in a load-bearing manner on tracks of the outer ring and the inner ring, a cover element having a fastening area for radially fastening the cover element to the outer ring or to a wheel support on the outside or inside, the cover element having a collecting channel surrounding a joint bell housing and protecting an encoder of the wheel bearing arrangement against contamination,
wherein the collecting channel forms part of a labyrinth seal, and wherein a sealing element for sealing the gear tooth systems, together with the collecting channel, forms the labyrinth seal.

2. The wheel bearing arrangement as recited in claim 1 wherein the inner ring is indirectly or directly drivable via spur gear teeth, and the spur gear teeth engaging with counter gear teeth of the joint bell housing, and both the spur and counter gear teeth being partially or entirely radially surrounded by the cover element.

3. The wheel bearing arrangement as recited in claim 1 wherein the cover element covers a sealing lip.

4. The wheel bearing arrangement as recited in claim 1 wherein the cover element has an opening for radially or axially inserting a sensor.

5. The wheel bearing arrangement as recited in claim 4 wherein the opening between the sensor and the cover element is sealed with the aid of a grommet or a sealing ring.

6. The wheel bearing arrangement as recited in claim 1 wherein the joint bell housing, together with the collecting channel, forms the labyrinth seal.

7. The wheel bearing arrangement as recited in claim 6 wherein the collecting channel is at least partially situated in a groove of the joint bell housing running in the circumferential direction.

8. The wheel bearing arrangement as recited in claim 1 wherein the sealing element radially surrounds the collecting channel axially on the end.

9. The wheel bearing arrangement as recited in claim 1 wherein the sealing element is fastened to the inner ring or the wheel hub.

10. The wheel bearing arrangement as recited in claim 9 wherein the sealing element includes an elastic part and a supporting part.

11. The wheel bearing arrangement as recited in claim 10 wherein the elastic part forms a sealing lip.

12. The wheel bearing arrangement as recited in claim 1 wherein the cover element has a discharge bore positioned at a lowest point.

* * * * *